US006522707B1

United States Patent
Brandstetter et al.

(10) Patent No.: US 6,522,707 B1
(45) Date of Patent: Feb. 18, 2003

(54) METHOD AND DEVICE FOR DISTURBANCE SUPPRESSION IN A SIGNAL

(75) Inventors: Markus Brandstetter, Freiberg (DE); Armin Hanneberg, Haar (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/302,652

(22) Filed: Apr. 30, 1999

(51) Int. Cl.[7] ................................. H04B 1/10
(52) U.S. Cl. ................... 375/350; 375/254; 375/289
(58) Field of Search ............... 375/229, 232, 375/233, 254, 285, 287, 288, 289, 345, 346, 348, 350; 455/63, 296, 307, 501; 327/551; 333/18, 28 R; 708/300, 301, 319, 323, 819

(56) References Cited

U.S. PATENT DOCUMENTS

| 5,257,286 A | * 10/1993 | Ray | 375/230 |
| 5,377,231 A | * 12/1994 | Sonntag | 375/345 |
| 5,880,645 A | * 3/1999 | Everitt et al. | 333/18 |
| 6,185,262 B1 | * 2/2001 | Brandstetter | 375/289 |
| 6,363,127 B1 | * 3/2002 | Heinonen et al. | 375/345 |

FOREIGN PATENT DOCUMENTS

DE          19735752 A1      2/1999

* cited by examiner

Primary Examiner—Stephen Chin
Assistant Examiner—Chieh M. Fan
(74) Attorney, Agent, or Firm—Laurence A. Greenberg; Werner H. Stemer; Ralph E. Locher

(57) ABSTRACT

Disturbances in bipolar signals transmitted on a transmission line are suppressed by adjusting the amplitude of the signals with coarse adjustment steps and with fine adjustment steps. The amplitude adjusted signals are compared to at least a lower reference level and an upper reference level for determining a first percentage of the amplitude adjusted signals violating the lower reference level and a second percentage of the amplitude adjusted signals violating the upper reference level. The coarse adjustment steps and the fine adjustment steps are selected in accordance with an adjustment characteristic which evaluates at least the first percentage and the second percentage. The adjustment characteristic is changed if a tendency of reference level violation of the amplitude adjusted signals is detected and a check is performed if the step of changing the adjustment characteristic improves the disturbance suppression. A device for suppressing disturbances is also provided.

9 Claims, 11 Drawing Sheets

METHOD AND DEVICE FOR DISTURBANCE SUPPRESSION IN A SIGNAL

BACKGROUND OF THE INVENTION

Field of the Invention

The invention relates to a method and a device for suppressing disturbances in a signal transmitted on a transmission line, in particular for suppressing disturbances in a PCM (Pulse Code Modulation) signal.

PCM transmission lines are increasingly used for transmitting digital data over long distances. Increasing the distance over which data are transmitted makes it more difficult to meet the requirements regarding the suppression of interference, noise, jitter, and other disturbances on the transmission line. Long transmission lines may also result in an increased amplitude damping for the electronic components connected to the transmission line.

A reduced supply voltage results in a severe reduction of the available voltage modulation range. If, for example, the worst case supply voltage of a device is 4.75 V and the voltage modulation range is reduced by 1 V with respect to the supply potential and the ground potential, respectively, the resulting voltage modulation range is 2.75 V. If, however, the worst case supply voltage is 3.15 V and the voltage modulation range is reduced by 0.8 V with respect to the supply potential and the ground potential, respectively, the resulting voltage modulation range is only 1.55 V. The available voltage modulation range of an input signal at an input of an electronic component may furthermore be reduced by ESD (Electrostatic Discharge) protection diodes. The ESD protection diodes result in a reduced range for the signal voltage amplitudes at the input of the electronic component. This leads to a low signal-to-noise ratio which even declines when long transmission lines are used, since the noise environment is kept to be the same due to required noise resistances in applications. In addition, the signal-to-noise ratio deteriorates as the length of the transmission line increases.

The noise at an input of an electronic component includes the self-noise at the input of the electronic component and the interference caused by disturbances picked up by transformers used for coupling signals into the transmission line. The disturbances picked up by the transformer are a major part of the NEXT (near-end cross talk) noise. The problem of cross talk is for example discussed in the article "Statistical Behavior of Crosstalk Power Sum with Dominant Components" in Bell Syst. Tech J., Vol. 60, No. 7.

A further problem arises from the temperature requirements that a transmission system must meet. The electronic components and the transmission line must operate in a temperature range of, for example, −40° C. to +85° C. without violating a maximum allowable bit error rate that the transmission system must be able to tolerate.

A transmission system furthermore has to be able to meet its transmission requirements even when a sending unit varies the amplitude of the sending signal. The PCM24 standard, for example, allows a variation of the amplitude of the sending signal in the range of between 2.4 V and 3.6 V in a time period of 102×650 nsec.

A prior art receiver receiving a signal is, for example, configured such that the signal amplitude is adjusted to have a desired value. A group delay equalization is performed in accordance with a fixed group delay equalization function that is based on known transmission properties of the transmission line. The transmission line is for example a cable whose transmission properties have been measured. In other words, if the correct amplification, which results in the desired amplitude, has been found, then the group delay equalization is also adjusted correctly. This adjustment method however presupposes that specific types of transmission lines or cables with known properties, predetermined amplitudes at the transmitter, and specific external circuits are used.

After the adjustment of the amplitude and the group delay of the received signal, the thus reconstructed signal fluctuates within boundaries due to noise, due to an amplitude modulation of the input signal, due to temperature changes, or due to any other disturbances. If the reconstructed signal fluctuates beyond these boundaries, then the signal may be adjusted again. German Published, Non-Prosecuted Patent Application DE 197 35 752 A1 describes such a system that readjusts the signals as soon as they leave their boundaries. A problem of a system that works as described above is that the modulation range may be severely restricted, as is described in the article "A 284 kbit/s ISDN Burst Transceiver", in IEEE Journal of Solid State Circuits, Vol. SC 22 No. 6, 1988.

SUMMARY OF THE INVENTION

It is accordingly an object of the invention to provide a method and a device for disturbance suppression in a signal which overcome the above mentioned disadvantages of the heretofore-known methods and devices of this general type and which effectively suppress modulation disturbances and at the same time keep bit error rates low.

With the foregoing and other objects in view there is provided, in accordance with the invention, a method for suppressing disturbances in signals transmitted on a transmission line, which comprises receiving signals having an amplitude; adjusting the amplitude of the signals with coarse adjustment steps and with fine adjustment steps for a disturbance suppression; subsequently comparing the amplitude adjusted signals to at least a lower reference level and an upper reference level for determining a first percentage of the amplitude adjusted signals violating the lower reference level and a second percentage of the amplitude adjusted signals violating the upper reference level; selecting the coarse adjustment steps and the fine adjustment steps in accordance with an adjustment characteristic which evaluates at least the first percentage and the second percentage; changing the adjustment characteristic if a tendency of reference level violation of the amplitude adjusted signals is detected; and checking it the step of changing the adjustment characteristic improves the disturbance suppression.

In accordance with another mode of the invention, the adjustment characteristic is changed such that an adjustment range of the fine adjustment steps is increased.

In accordance with a further mode of the invention, modulation disturbances are suppressed with the step of adjusting the amplitude of the signals.

In accordance with yet another mode of the invention, the coarse adjustment steps are per formed with a filter selectively operating with a first filter stage suited for signals received from a transmission line having a first length and opera ting with a second filter stage suited for signals received from a transmission line having a second length, the second length being greater than the first length; the fine adjustment steps covering a first amplitude range, when the filter operates with the first filter stage and covering a second amplitude range when the filter operates with the second filter stage, the first amplitude range being greater than the second amplitude range.

In accordance with a further mode of the invention, the first amplitude range is extended by a range of at least 3 dB beyond a lower boundary and beyond an upper boundary of the second amplitude range.

In accordance a yet a further mode of the invention, the range of the at least 3 dB is divided into three fine adjustment steps each having a step width of at least 1 dB.

In accordance a yet another mode of the invention, the adjustment characteristic is changed in dependence of the step of checking if the disturbance suppression has improved.

With the objects of the invention in view there is also provided a device for suppressing disturbances in signals transmitted on a transmission line, comprising an equalizer receiving signals having an amplitude and adjusting the amplitude of the signals; the equalizer having a gain control device for providing fine adjustment steps and having a filter connected to the gain control device, the filter providing coarse adjustment steps; a level detector connected to the equalizer for comparing the amplitude adjusted signals to at least a lower reference level and an upper reference level; a control device connected to the equalizer for determining a first percentage of the amplitude adjusted signals violating the lower reference level and a second percentage of the amplitude adjusted signals violating the upper reference level, for detecting a tendency of reference level violation of the amplitude adjusted signals, for controlling the equalizer to perform the coarse adjustment steps and the fine adjustment steps in accordance with an adjustment characteristic which evaluates at least the first percentage and the second percentage, and for changing the adjustment characteristic on detection of the tendency of reference level violation of the amplitude adjusted signals.

In accordance with another feature of the invention, the control device changes the adjustment characteristic by increasing an adjustment range of the fine adjustment steps. In accordance with yet another feature of the invention, the filter has a first filter stage suited for signals received from a transmission line having a first length and has a second filter stage for signals received from a transmission line having a second length, the second length being greater than the first length, the fine adjustment steps covering a first amplitude range, when the filter operates with the first filter stage and covering a second amplitude range when the filter operates with the second filter stage, the first amplitude range being greater than the second amplitude range.

Although the invention is illustrated and described herein as embodied in a method and a device for disturbance suppression, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
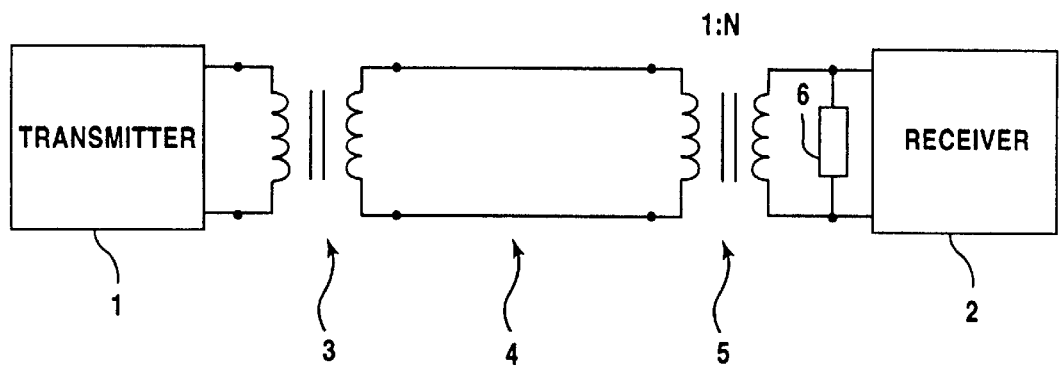
FIG. 1 is a schematic configuration of a transmission system in which the method and device according to the invention can be used.

Referring now to the figures of the drawings in detail and first, particularly, to FIG. 1 thereof, there is shown a schematic configuration of a transmission system which is used for PCM ISDN (Integrated Services Digital Network) data transmission. The transmission system has a transmitter 1 and a receiver 2. The output of the transmitter 1 is connected to a first transformer 3. The first transformer 3 is also connected to the transmitter side of a transmission line 4, which may for example be a 22 AWG cable. The receiver side of the transmission line 4 is connected to a second transformer 5, which has a transformer ratio of 1:N. The second transformer 5 is also connected to an input of the receiver 2. The input of the receiver may also be connected to an external component 6, which is an interface circuit that performs functions such as transmission line adaption, impedance matching or component protection.

The transmitter 1 generates an output signal at its output. The output signal is coupled into the transmission line 4 via the first transformer 3. The signal is then received at the input of the receiver 2 via the second transformer 5.

Figure 2:
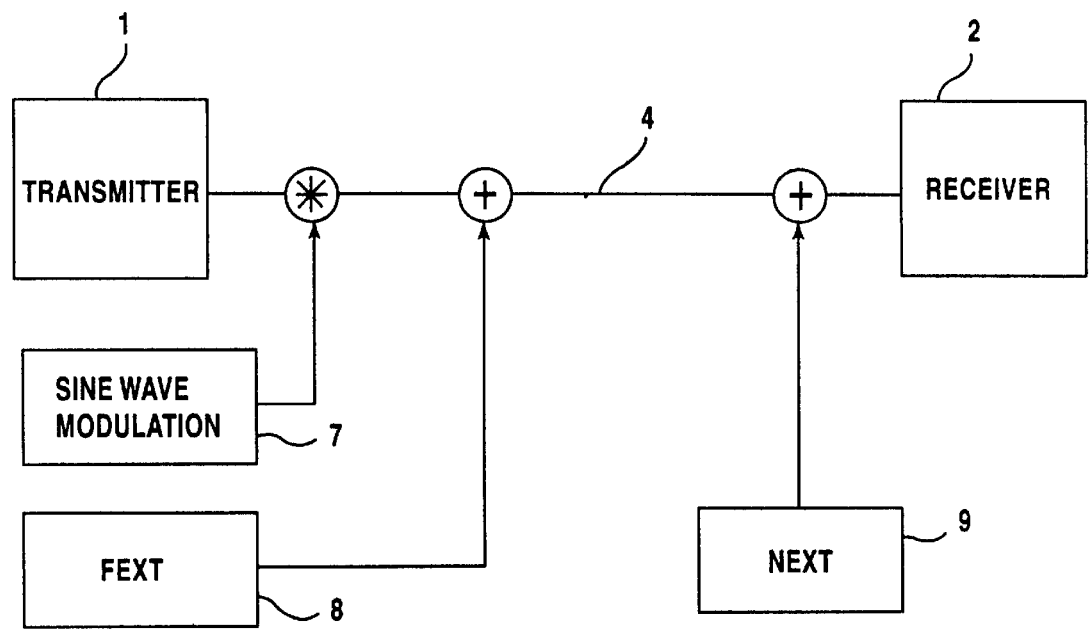
FIG. 2 is a schematic diagram of a transmission system with disturbances introduced into the transmission system.

FIG. 2 illustrates how disturbances that are coupled into the transmission system are simulated in a model. The output signal from the output of the transmitter 1 is modulated by a sine-wave modulation generator 7 that simulates noise generation in the transmission line. The far end crosstalk is simulated by a FEXT (Far End Crosstalk) generator 8, the near end crosstalk is simulated by a NEXT (Near End Crosstalk) generator 9.

Figure 3:
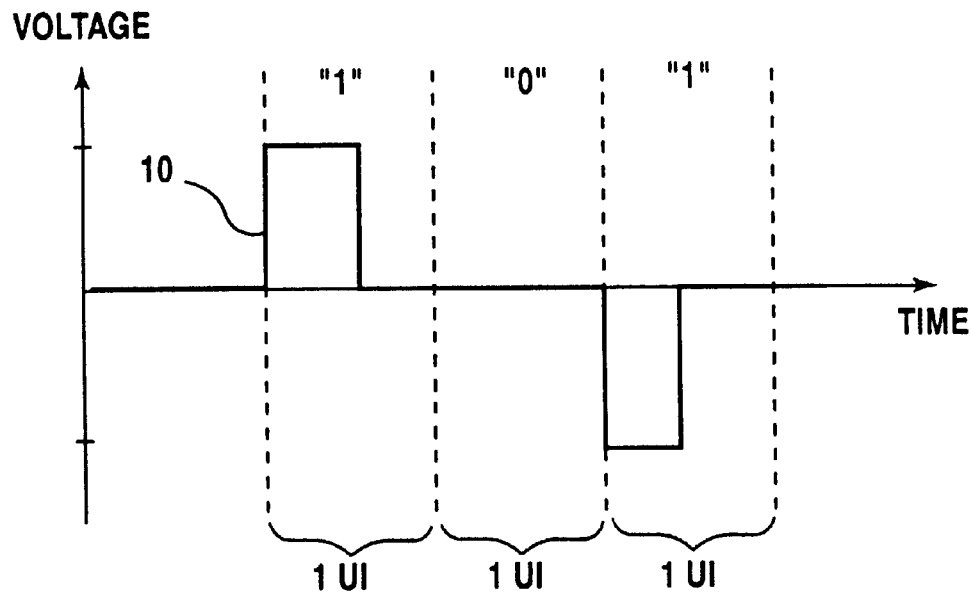
FIG. 3 is a signal diagram of an undisturbed bipolar signal.

The signal diagram of FIG. 3 shows an undisturbed bipolar signal 10, after it has been output by the transmitter 1 and after it has been transmitted through the first transformer 3. At this point, the bipolar signal on the output side of the first transformer 3 is not yet affected by any disturbance. The pulses shown in FIG. 3 indicate digital values "1".

Figure 4:
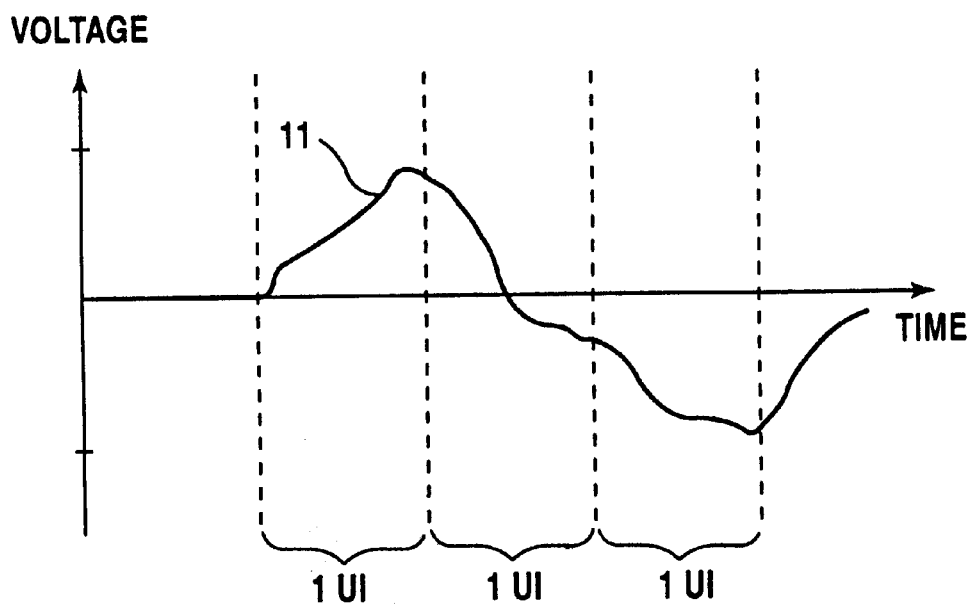
FIG. 4 is a signal diagram of a bipolar signal with disturbances.

FIG. 4 illustrates a disturbed bipolar signal 11. A signal transmitted over the transmission line 4 is affected by various forms of disturbances such as noise, crosstalk, and group delay. The undisturbed bipolar signal 10 shown in FIG. 3 is thus transformed by those disturbances into the disturbed bipolar signal illustrated in FIG. 4. The disturbed signal needs to be reconstructed in order to reverse the effects of the disturbances. The invention is described as being used to suppress disturbances of bipolar signals, but can of course be used in the same manner for suppressing disturbances of unipolar signals.

Figure 5:
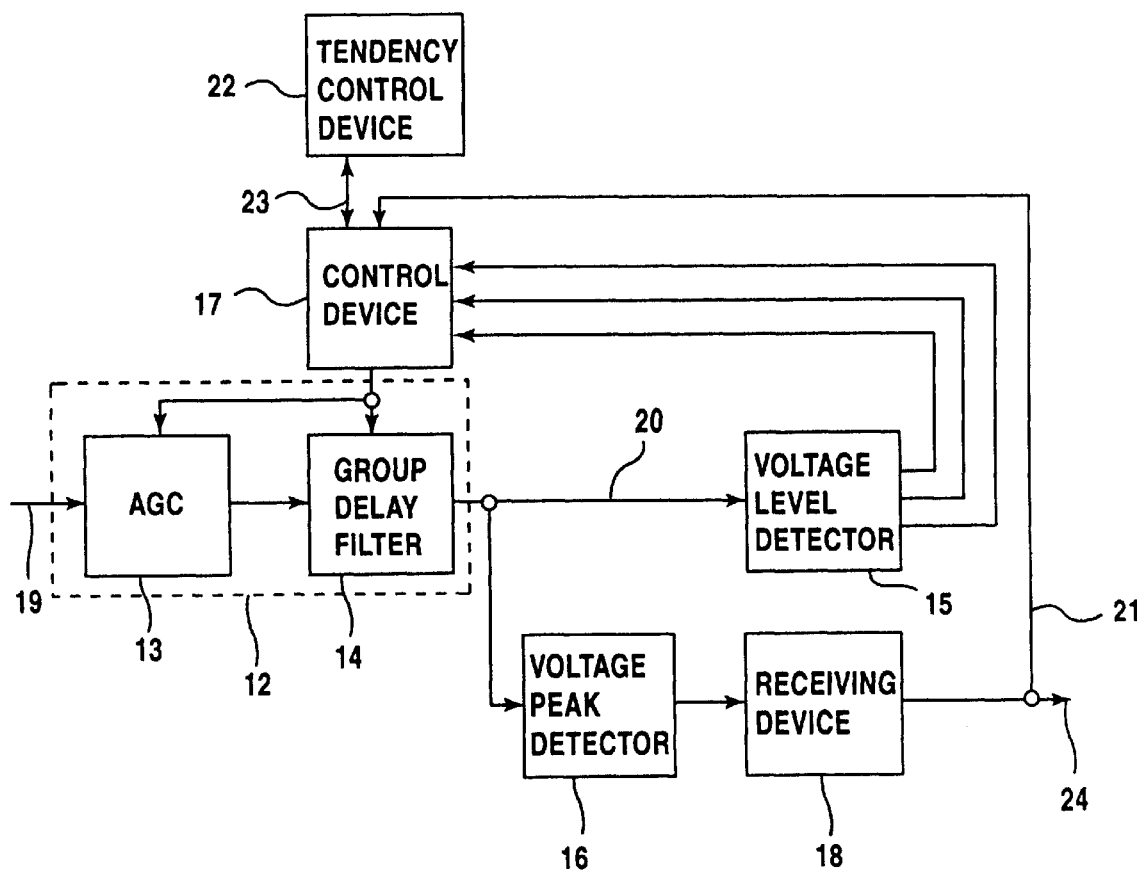
FIG. 5 is a schematic block diagram of a device for suppressing disturbances according to the invention.

FIG. 5 illustrates an exemplary embodiment of a device for suppressing disturbances. An equalizer 12 for equalizing the amplitude and the group delay of the received signals includes an automatic gain control device 13, also called AGC, and a group delay filter 14 connected to the automatic gain control device 13. A disturbed signal, such as the disturbed bipolar signal shown in FIG. 4, which is transmitted on a receive path 19 of a transmission line 4, is received at an input of the automatic gain control device 13. The output of the automatic gain control device 13 is connected to the group delay filter 14 and the disturbed bipolar signal is transferred from the automatic gain control device 13 to the group delay filter 14. The output of the group delay filter 14 is connected in parallel to an input of a voltage level detector 15 and to an input of a voltage peak detector 16.

Figure 15:
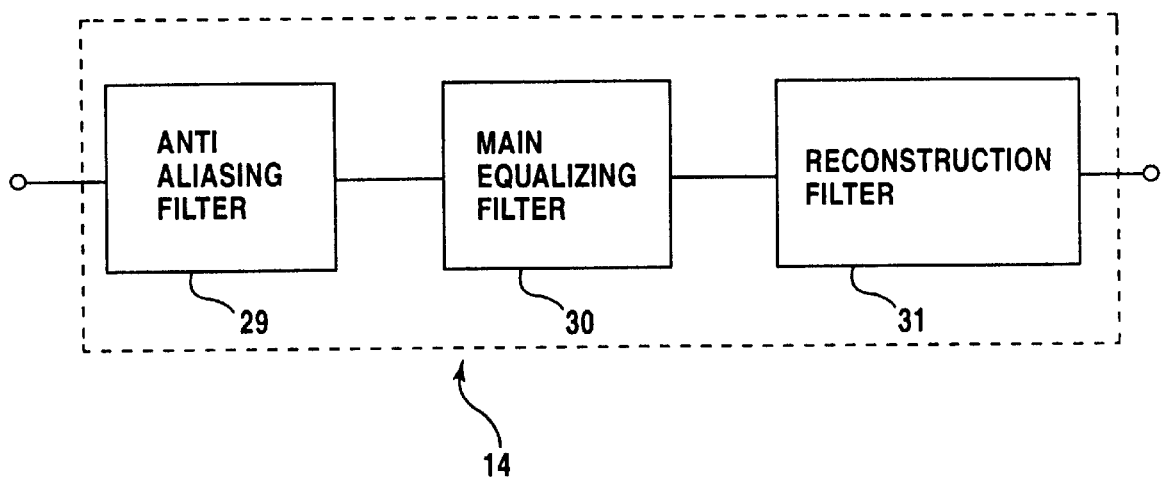
FIG. 15 is a diagrammatic view of an exemplary group delay filter.

An exemplary embodiment of the group delay filter 14 is described in further detail in FIG. 15. The group delay filter 14 preferably includes an anti-aliasing filter 29, a main equalizing filter 30, and a reconstruction filter 31 connected in series. The anti-aliasing filter 29 may be embodied as a low-pass filter for filtering out high frequency disturbances. The anti-aliasing filter may be described using a time-continuous transfer function. The actual equalization of the bipolar signal is performed in the main equalizing filter 30. The main equalizing filter may be characterized by a z-transfer function H(z). The properties of the transmission line 4 determine the position of the poles and zero points of the z-transfer function H(z) which is used to describe the main equalizing filter 30. A long length for the transmission line 4 results in z-transfer function H(z) having a high order. In such cases it is preferable to divide the main equalizing filter 30 into equalizer stages, each stage having a z-transfer function. The reconstruction filter 31 is for example a low-pass filter that can be described in terms of a time-continuous transfer function H(s).

The voltage level detector 15 may for example have three outputs for outputting signals indicating a violation of voltage reference levels by the signals on line 20. These three outputs are connected to inputs of a control device 17 in order to form a feedback loop. An output of the control device 17 is connected to the automatic gain control 13 and to the group delay filter 14 for controlling these devices. The output of the voltage peak detector 16 is connected to the input of a receiving device 18. The receiving device 18 receives the bipolar signals, processes them and outputs a data stream on an output line 24. The data stream may be further processed or transmitted on a further transmission line. The output of the receiving device 18 is also connected to the control device 17 via a feeding back line 21 for feeding back the data stream. The control device 17 checks if there is a data stream present at the output of the receiving device 18 and evaluates the data stream for controlling the equalizer 12. A tendency control device 22 is connected to the control device 17 via a bi-directional line 23.

Figure 6:
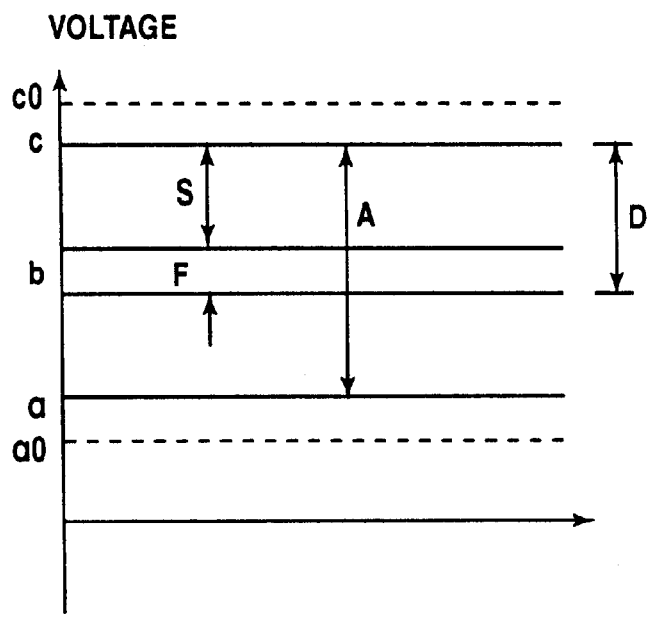
FIG. 6 is a diagram indicating reference levels used in the device of FIG. 5.

The bipolar signals of the data stream on the receive path 19 are affected by the disturbances illustrated in FIG. 2. The automatic gain control 13 and the group delay filter 14 operate to reconstruct the amplitude of the bipolar signal to a constant nominal value. For this purpose, the voltage course on the output line 20 of the equalizer 12 is checked for violation of reference levels a, b, and c illustrated in FIG. 6. A lower reference level a and an upper reference level c are used for a coarse adjustment of the voltage amplitude in the automatic gain control 13 and in the group delay filter 14. A middle reference level b for a fine adjustment is located at a distance D from the upper reference level c. The fine adjustment is achieved by setting the automatic gain control 13 to a desired gain value. The coarse adjustment is achieved by setting the gain in the group delay filter 14. In the exemplary embodiment only five different settings for the gain are used in the group delay filter 14. These settings for the gains are also referred to as equalizer stages. The range of modulation A of the automatic gain control 13 and the group delay filter 14 determines the distance between the upper reference level c and the lower reference level a. The distance D between the upper reference level c and the middle reference level b is determined by the sum S of all disturbances to be taken into account and the range of modulation of the fine adjustment F of the automatic gain control 13 and the group delay filter 14. In other words D=F+S is determined by the relationship F/2+S=A/2. The invention furthermore uses so-called virtual reference levels $a_0$ and $c_0$ for a virtual expansion of the range of modulation A.

Figure 7:
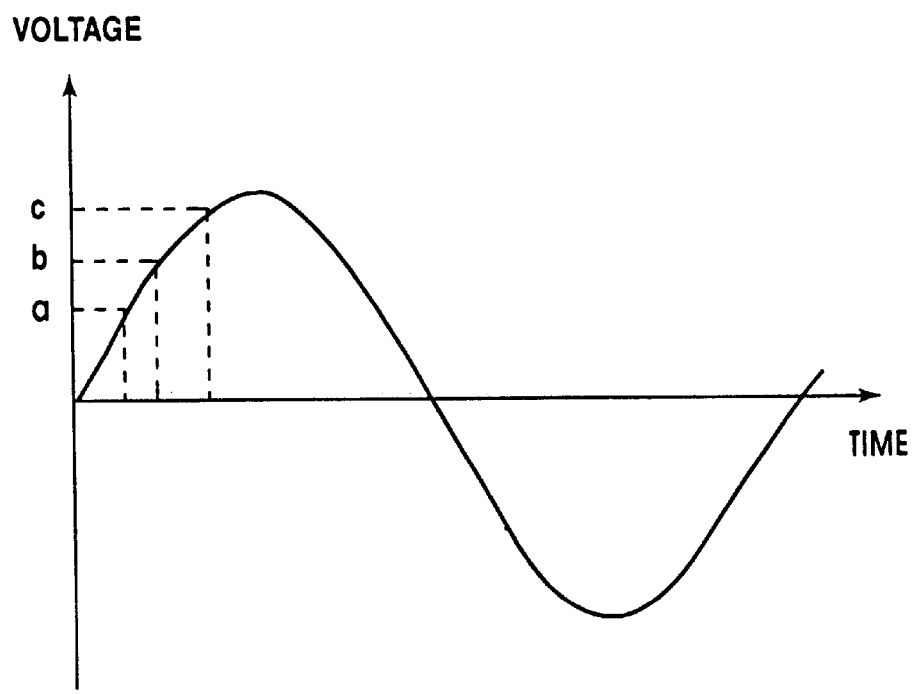
FIG. 7 is a diagram of a bipolar signal which is sampled for detecting whether the reference levels are exceeded.
Figure 8:
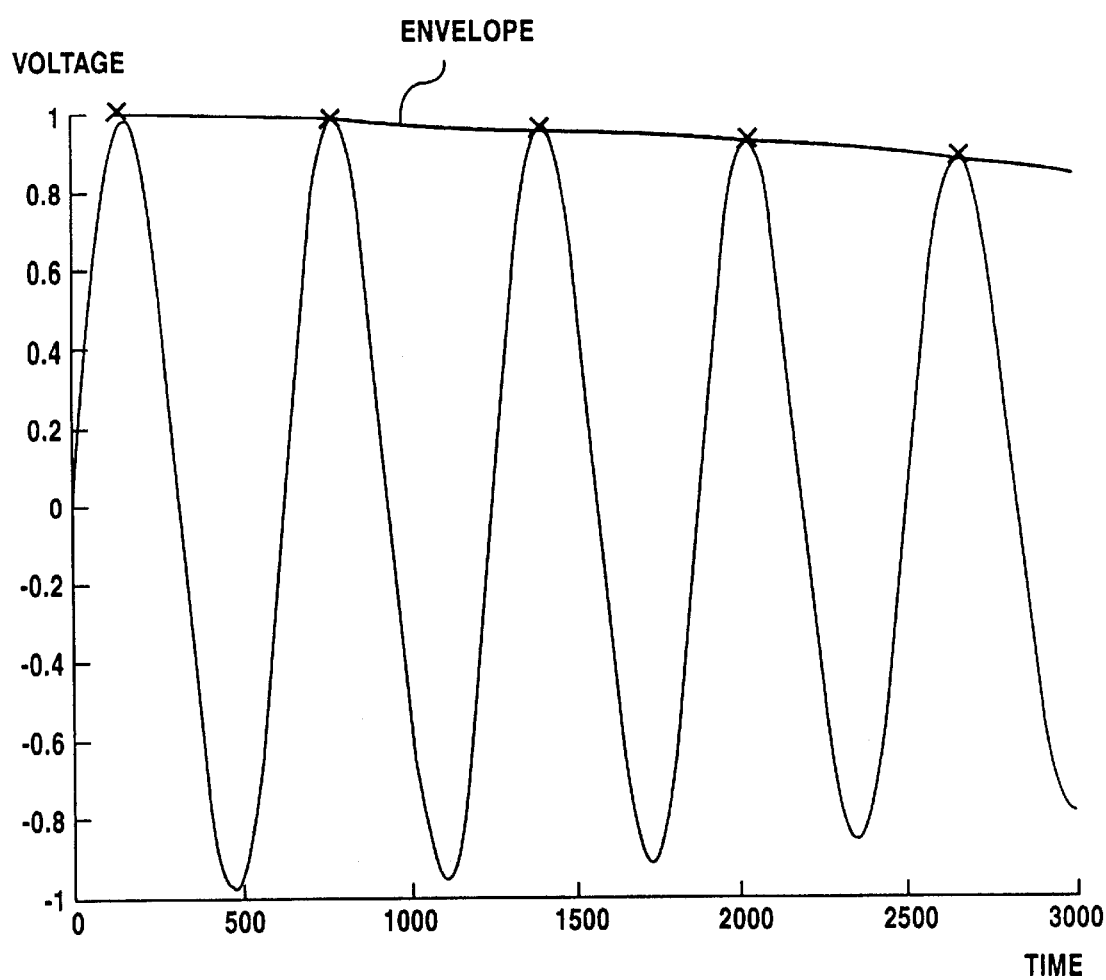
FIG. 8 is a diagram illustrating the tendency of a signal amplitude.

FIG. 7 illustrates how a bipolar signal is sampled in order to detect whether the reference levels a, b, and c are exceeded. In the example illustrated in FIG. 7 all three reference levels a, b, and c are exceeded or violated. In response to output signals from the voltage level detector 15 which indicate a violation of the reference levels a, b, or c and the receiving device 18, the control device 17 adjusts the setting of the automatic gain control 13 and the transfer function of the group delay filter 14. The setting of the automatic gain control 13 is adjusted in accordance with the fine adjustment. The transfer function of the group delay filter 14 is adjusted in accordance with the coarse adjustment. The control device 17 further operates in response to the tendency control device 22. The tendency control 22 operates based on an evaluation of output signals from the voltage level detector 15 and the receiving device 18. FIG. 8 illustrates the tendency of a voltage signal. The tendency of a signal is the first derivative of the envelope of the peaks of the signal amplitudes.

The bipolar signals are sampled in order to detect whether the reference levels a, b, and c are exceeded, in other words whether the reference levels are violated. Preferably a sub-sampling is used in which the sampling period is a multiple of a zero-clock period of the signal to be sampled. A zero-clock period refers to a data stream having a minimum density of logical "1" signals, for instance a data stream having 15 "0" signals and three "1" signals. Due to the subsampling, a misinterpretation of the sampled levels may occur randomly. These randomly occurring misinterpretations have to be taken into account when the sampled signal is evaluated. The violations of the voltage levels are preferably evaluated in the control device 17 in accordance with a random evaluation based on the principle of a median filtering. The evaluation is based on decision criteria supplied by the tendency control device 22.

Figure 9:
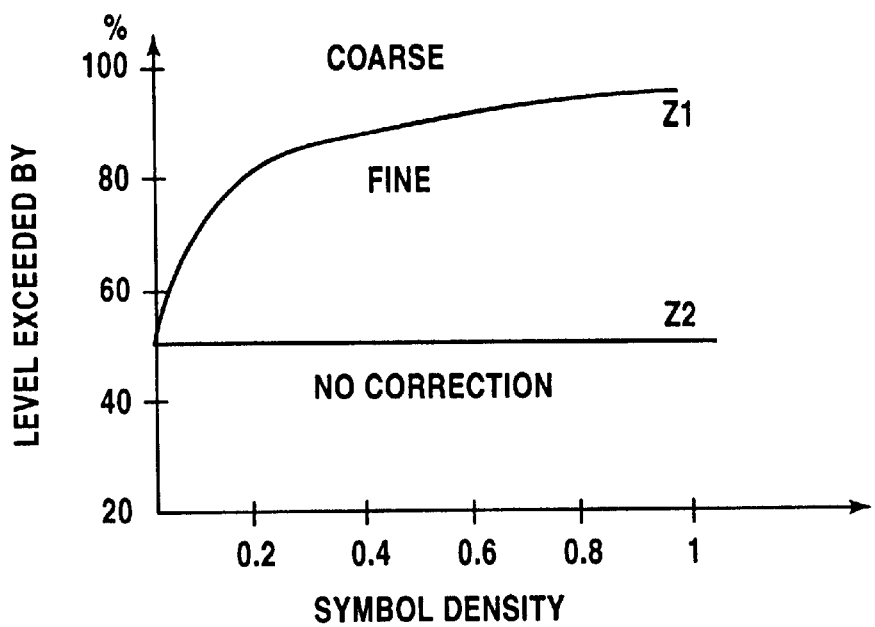
FIGS. 9 and 10 are diagrams illustrating decision criteria used in the device of FIG. 5.
Figure 10:
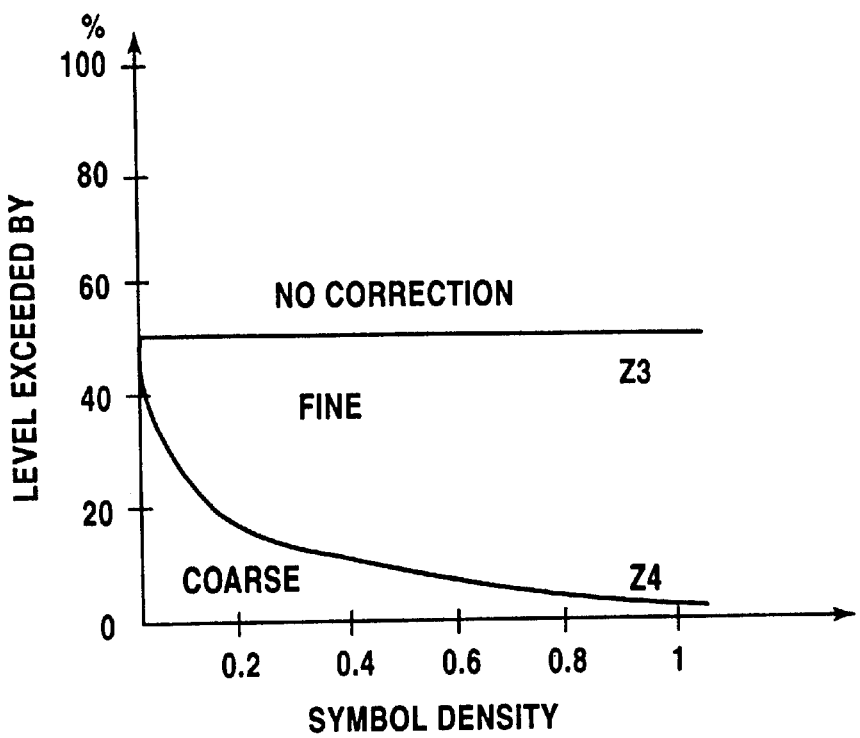

FIGS. 9 and 10 illustrate in an exemplary manner the decision criteria for evaluating a violation of the upper reference level c and the lower reference level a, respectively. FIG. 9 indicates a first decision threshold Z1 and second decision threshold Z2. If the upper level c is exceeded by a percentage value that is less than Z2, then the equalizer is adapted and no correction is necessary. If the upper level c is exceeded by a percentage value between Z2 and Z1, then a fine adjustment is performed. If the upper level c is exceeded by a percentage value larger than Z1, then a coarse adjustment is performed. FIG. 10 illustrates the behavior of the control device 17 in response to a violation of the lower reference level a. A third decision threshold Z3 and fourth decision threshold Z4 are shown. If the lower level a is exceeded by a percentage value that is less than Z4, then a coarse adjustment is performed. If the lower level a is exceeded by a value between Z4 and Z3, then a fine adjustment is performed. If the lower level a is exceeded by a value larger than Z3, then the equalizer is adapted and no correction is necessary. In FIGS. 9 and 10, the decision thresholds Z1 and Z4 are a function of the symbol density of the bipolar signal whereas the decision thresholds Z2 and Z3 are constant with respect to the symbol density. Of course, the decision thresholds Z2 and Z3 could also be provided as a function of the symbol density. The examples shown in FIGS. 9 and 10 have decision thresholds Z1 to Z4 which are based on exceeding the upper and the lower threshold level by 50%. This means that the number of bipolar signals in the data stream whose amplitude exceeds the decision thresholds during the coarse adjustment or during the fine adjustment is 50%.

By detecting that violations of the reference levels occur occasionally it is possible to detect that an input bipolar signal is modulated by a disturbance. Permitting violations of the reference levels up to a certain percentage value causes an increased tolerance toward this modulation disturbance.

A coarse adjustment may for instance be necessary after switching the transmission line or after a drastic jump in the signal amplitude. If, for instance, the lower reference level a is only exceeded by 5% of the pulses, a quick correction is necessary.

A fine adjustment may be necessary if the transmitter 1 leaves its specified operating range or if the voltage supply for the device shown in FIG. 5 leaves its specified operating range. A fine adjustment may also be necessary due to random disturbances that are outside the frequency range in which the median filtering suppresses disturbances. The fine adjustment is less likely to generate bit errors than the coarse adjustment.

Long-term effects such as temperature changes along the transmission path or a drift of the voltage level of the transmitter are evaluated in a so called verification period. The reconstructed signal amplitudes move within the voltage range bounded by the lower reference level a and the upper reference level c. In order to have a maximum modulation range as well as long-term stability and a quick response time, the violation of the reference levels is determined by a random evaluation, which takes into account the percentage of pulses that violate the reference levels. The evaluation thus distinguishes between a coarse adjustment and a fine adjustment. During the verification period, the middle reference level is preferably no longer determined by an output signal of the voltage level detector 15 but is determined by the regenerated data stream that is supplied to the control device 17 via the feed back line 21.

Figure 11:
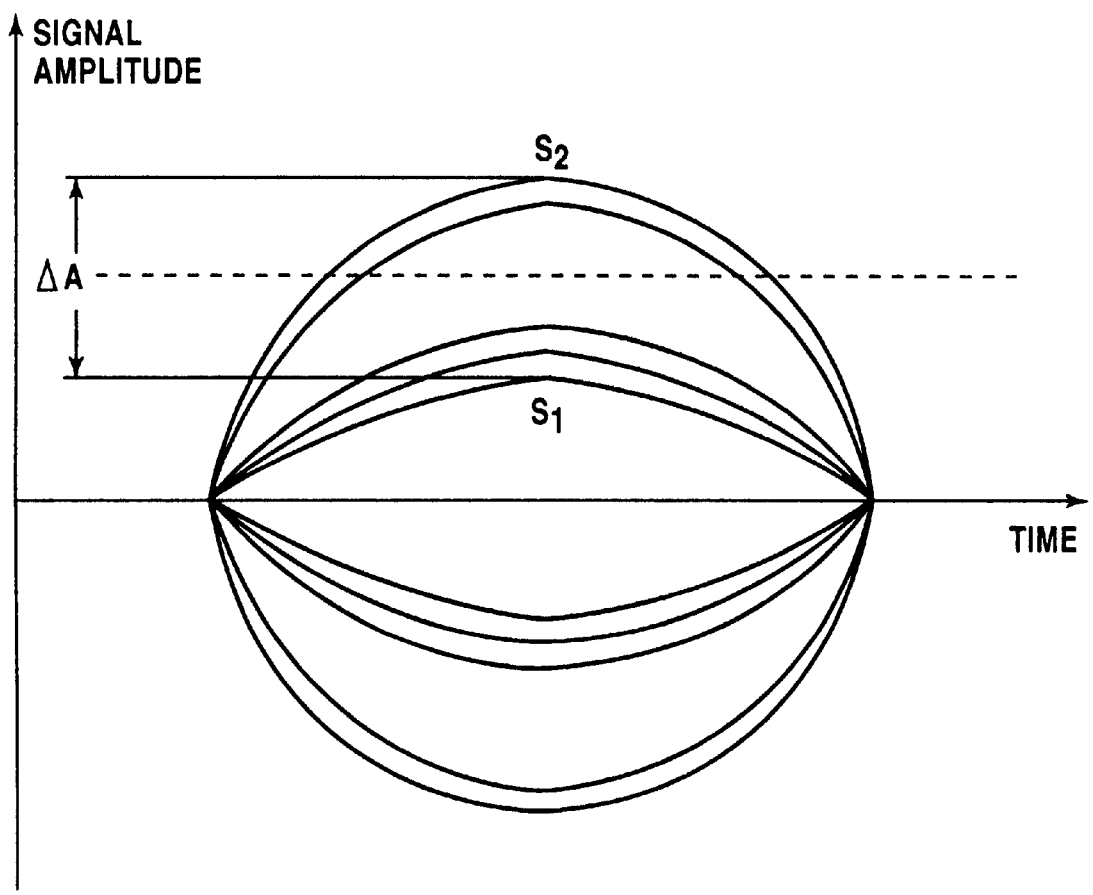
FIG. 11 is an eye pattern illustrating a variation in the signal amplitude due to a variation in the data pulse density.

In a preferred embodiment, an unnecessary termination of a fine adjustment or a termination of the verification period due to a drastic change in the statistic distribution of 0's and 1's in the data stream statistic is prevented by taking into account how the signal amplitude varies due to changes in the pulse densities in the data stream. FIG. 11 is an eye pattern that shows such a variation in the signal amplitude of a reconstructed signal due to a variation in the data pulse density. $S_1$ indicates the path that results from a high pulse density, $S_2$ indicates the path that results from a low pulse density or signal density. The variation in amplitude is indicated as $\Delta A$. The evaluation of the violation of the levels a, b, and c is performed under the constraint that a certain amplitude variation $\Delta A$ is acceptable.

Figure 12:
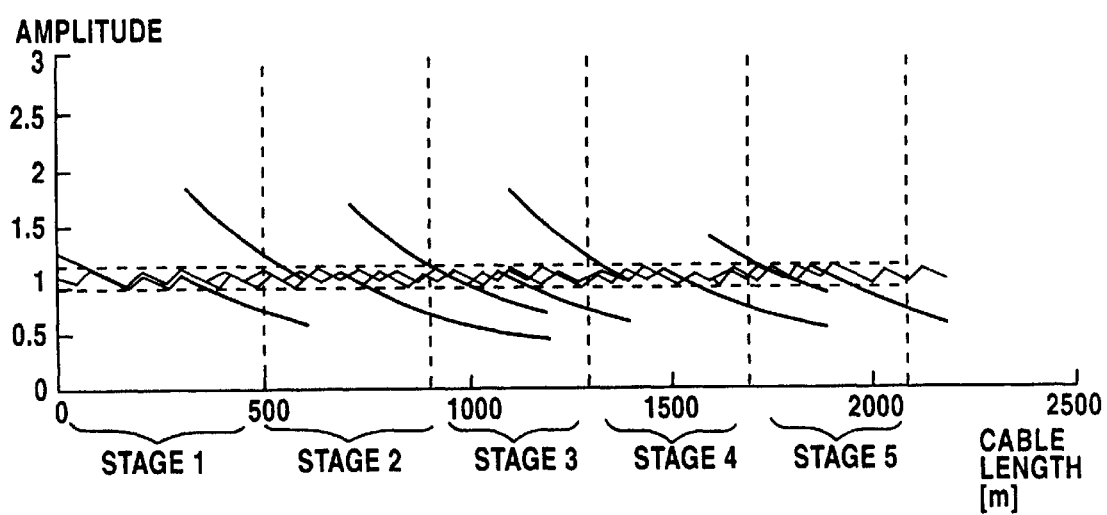
FIG. 12 illustrates equalizer stages for various cable lengths.

The tendency control device 22 operates such that the criteria for controlling the automatic gain control 13 and the group delay filter 14 can be changed during operation. In this case, the percentages of pulses violating the thresholds shown in FIGS. 9 and 10 are changed during operation. Changing the criteria for controlling the automatic gain control 13 and the group delay filter 14 results in a system that has a high tolerance for severe random disturbances. In case the result of an evaluation of thresholds using such changed criteria is used in a further switching from one adjustment mode to another adjustment mode, then a closed loop control of the adjustment is achieved. In such a closed loop control of the adjustments, the fine adjustment may be varied in a predefined range and in a predefined manner. For the fine adjustment, the gain of the automatic gain control 13 may for example be switched step-wise up and down three times covering a total gain range of 4.2 dB. In case this variation in the fine adjustment does not result in a satisfactory result, the criteria for controlling the automatic gain control 13 and the group delay filter 14 can be changed again, in other words the percentages of pulses violating the thresholds shown in FIGS. 9 and 10 are changed again. The described operation provides an extended range of adjustment by adding a so-called virtual adjustment range that extends beyond the lower reference level a and the upper reference level c. The added range of operation is indicted by the virtual reference levels $a_0$ and $c_0$ in FIG. 6. An equalizer stage represents a range of the length of the transmission line for which identical combinations of poles and zero points of the equalizer transfer function are used. In the exemplary example five equalizer stages are used. In other words the group delay filter 14 can be set to any of those five equalizer stages. Each equalizer stage results in a specific gain by which the bipolar signal is amplified. FIG. 12 illustrates five equalizer stages for cable lengths of 0 to 2000 m. The reconstructed course of the amplitudes for the five equalizer stages is also shown in FIG. 12. The equalizer stages overlap in their operating ranges such that there are no gaps in the coarse adjustment.

Figure 16:
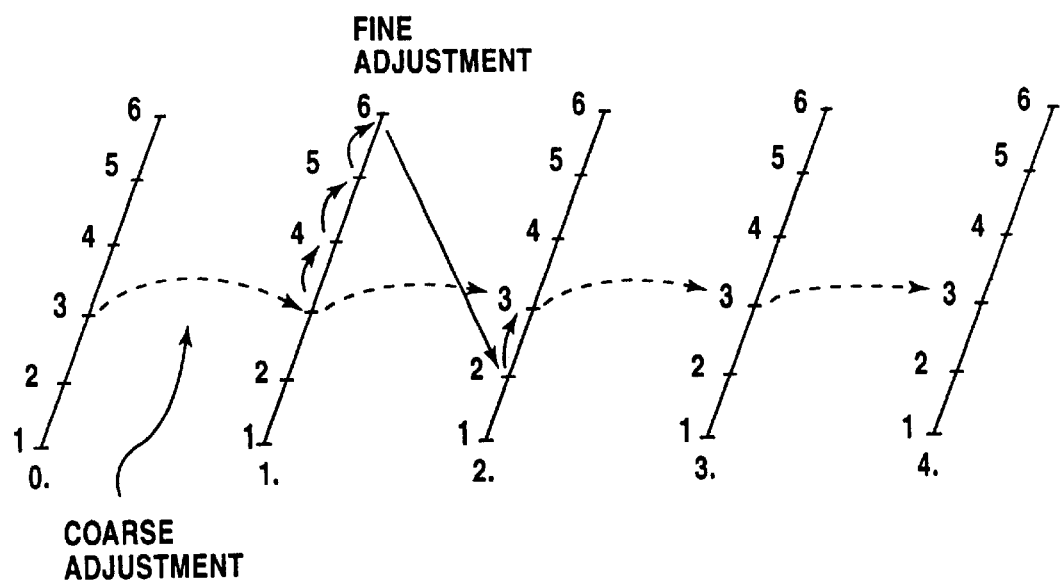
FIG. 16 is a graph illustrating the steps during a coarse adjustment and a fine adjustment.

The graph in FIG. 16 illustrates the steps during a coarse adjustment and a fine adjustment. The bipolar signal is compared to three reference levels and is evaluated in the voltage level detector 15. If the evaluation detects that the upper or lower reference levels are violated in accordance with criteria as shown in FIGS. 9 and 10, then an adjustment of the equalizer setting may be necessary. If necessary, the group delay filter 14 is switched in a coarse adjustment step. The group delay filter 14 is switched upwards in coarse adjustment steps by switching to increasingly higher equalizer stages until the upper reference level c is violated. In a subsequent step, the coarse adjustment is switched back by one equalizer stage. Then a fine adjustment is performed. During the fine adjustment, the gain of the automatic gain device 13 is switched up step-wise until the middle reference level b is violated. FIG. 16 illustrates the above-mentioned steps for a configuration using six stages for the automatic gain control (AGC stages) and using a bypass (stage 0) and four equalizer stages (stage 1–4) for the group delay filter 14. Except for the bypass each of the four equalizer stages uses as a default stage for the automatic gain control the third AGC stage.

Figure 13:
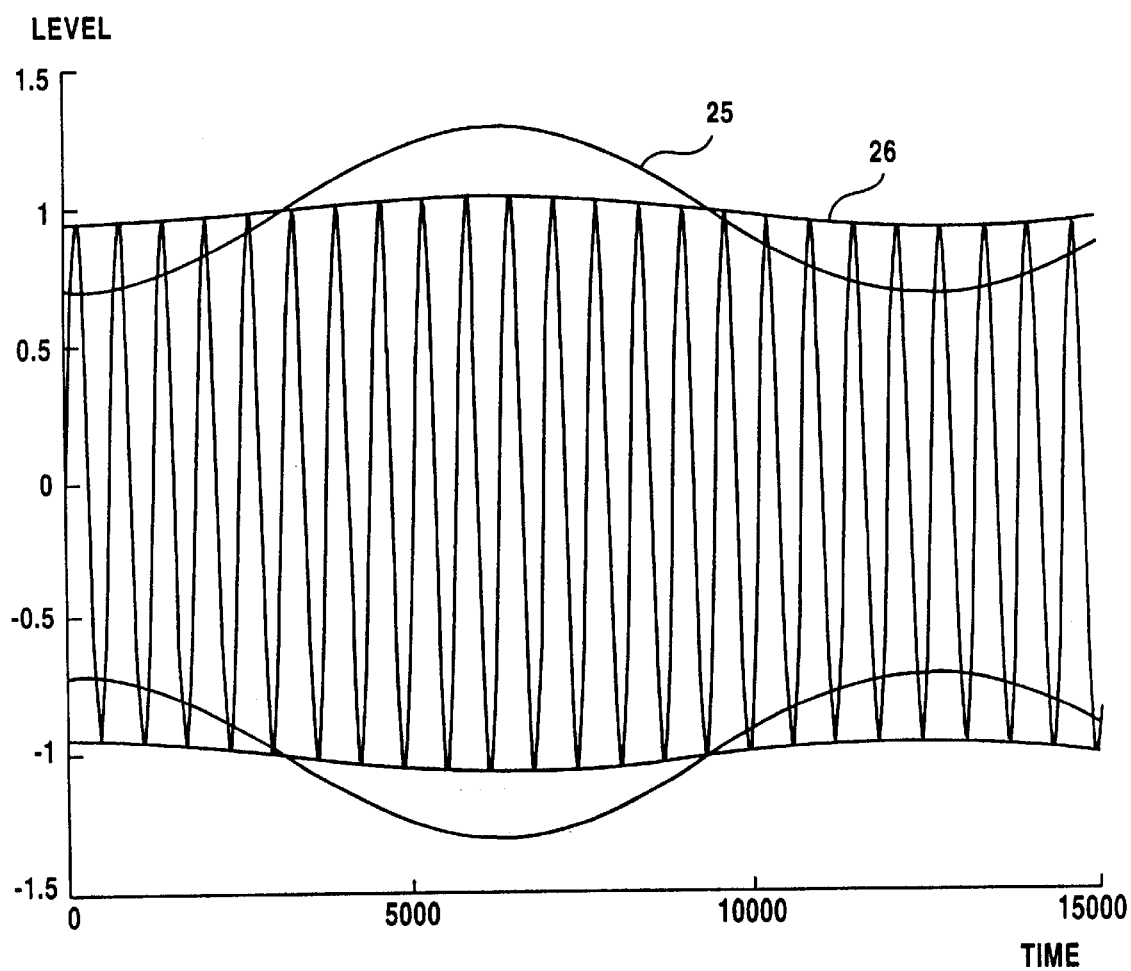
FIG. 13 is a diagram of the envelope of a modulated input signal and a reconstructed signal according to a fine adjustment with a tendency control.

The range of modulation A can be varied based on information on the set stage of the equalizer for a tendency control. In accordance with the invention, the first stage of the equalizer is adjusted to have a characteristic that is different from the standard characteristic shown in FIGS. 9 and 10. This has the effect that the limit frequency for suppressing periodic disturbances is lowered. FIG. 13 shows the envelope 25 of a modulated bipolar input signal and an envelope 26 of the reconstructed signal after changing the equalizer characteristic from the standard characteristic to a characteristic having a low limit frequency for periodic disturbances. FIG. 13 shows that the periodic disturbance or modulation indicated by 25 is suppressed in the reconstructed signal indicated by 26. The adjustment of the characteristic of the equalizer allows a fine adjustment that can follow an extended range of amplitudes without triggering a coarse adjustment. The extended range of operation of the fine adjustment prevents a switching over to a coarse adjustment and thus prevents an increase in bit errors.

Figure 14:
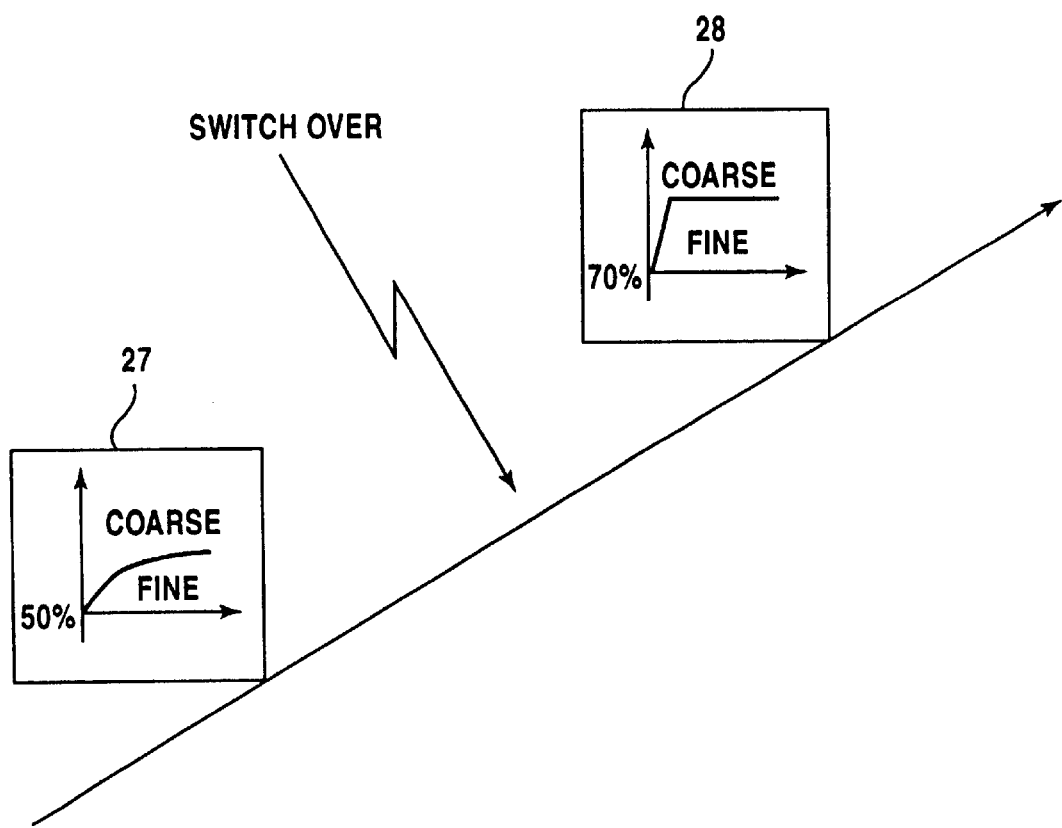
FIG. 14 is an illustration of a switchover between two different equalizer characteristics.

FIG. 14 illustrates a switchover of the equalizer characteristic from a standard characteristic 27 as shown in FIG. 9 to a characteristic 28 having a pronounced range for the fine adjustment. The switchover from the standard characteristic 27 to the characteristic 28 is performed in dependence on the tendency of the voltage signal.

We claim:

1. A method for suppressing disturbances in signals transmitted on a transmission line, the method which comprises:
   receiving signals having an amplitude;
   adjusting the amplitude of the signals with coarse adjustment steps and with fine adjustment steps for a disturbance suppression, including:
   performing the coarse adjustment steps with a group delay filter selectively operating with a first filter stage suited for signals received from a transmission line having a first length and operating with a second filter stage suited for signals received from a transmission line having a second length, the second length being greater than the first length; and
   performing the fine adjustment steps with a gain control device selectively operating at a plurality of different gains, the fine adjustment steps covering a first amplitude range, when the group delay filter operates with the first filter stage and covering a second amplitude range when the filter operates with the second filter stage, the first amplitude range being greater than the second amplitude range;
   subsequently comparing the amplitude adjusted signals to at least a lower reference level and an upper reference level for determining a first percentage of the amplitude adjusted signals violating the lower reference level and a second percentage of the amplitude adjusted signals violating the upper reference level;
   selecting the coarse adjustment steps and the fine adjustment steps in accordance with an adjustment characteristic which evaluates at least the first percentage and the second percentage;
   changing the adjustment characteristic if a tendency of reference level violation of the amplitude adjusted signals is detected; and
   checking if the step of changing the adjustment characteristic improves the disturbance suppression.

2. The method according to claim 1, which comprises changing the adjustment characteristic such that an adjustment range of the fine adjustment steps is increased.

3. The method according to claim 1, which comprises suppressing modulation disturbances with the step of adjusting the amplitude of the signals.

4. The method according to claim 1, which comprises extending the first amplitude range by a range of at least 3 dB beyond a lower boundary and beyond an upper boundary of the second amplitude range.

5. The method according to claim 4, which comprises dividing the range of the at least 3 dB into three fine adjustment steps each having a step width of at least 1 dB.

6. The method according to claim 1, which comprises further changing the adjustment characteristic in dependence of the step of checking if the disturbance suppression has improved.

7. The method according to claim 1, wherein the signals are bipolar signals.

8. A device for suppressing disturbances in signals transmitted on a transmission line, comprising:
   an equalizer receiving signals having an amplitude and adjusting the amplitude of the signals;
   said equalizer having a gain control device for providing fine adjustment steps and having a group delay filter connected to said gain control device, said filter providing coarse adjustment steps;
   said filter having a first filter stage suited for signals received from a transmission line having a first length and haing a second filter stage for signals received from a transmission line having a second length, the second length being greater than the first length;
   said fine adjustment steps covering a first amplitude range, upon said filter operating with said first filter stage and covering a second amplitude range upon said filter operating with said second filter stage, said first amplitude range being greater than said second amplitude range;
   a level detector connected to said equalizer for comparing the amplitude adjusted signals to at least a lower reference level and an upper reference level;
   a control device connected to said equalizer for determining a first percentage of the amplitude adjusted signals violating said lower reference level and a second percentage of the amplitude adjusted signals violating said upper reference level, for detecting a tendency of reference level violation of the amplitude adjusted signals, for controlling said equalizer to perform said coarse adjustment steps and said fine adjustment steps in accordance with an adjustment characteristic evaluating at least said first percentage and said second percentage, and for changing said adjustment characteristic on detection of the tendency of reference level violation of the amplitude adjusted signals.

9. The device according to claim 8, wherein said control device changes said adjustment characteristic by increasing an adjustment range of said fine adjustment steps.

* * * * *